United States Patent Office 3,028,430
Patented Apr. 3, 1962

3,028,430
PROCESS FOR THE PRODUCTION OF OPTICALLY ACTIVE ISOMERS OF AMPHETAMINE
James M. Gillingham, Royal Oak, Mich., assignor to Parke, Davis & Company, Detroit, Mich., a corporation of Michigan
No Drawing. Filed Mar. 28, 1955, Ser. No. 497,410
7 Claims. (Cl. 260—570.8)

This invention relates to a process for the production of optical isomers of amphetamine. More particularly, the invention relates to a process for the resolution of *dl*-amphetamine employing an optically active N-acyl amino acid as a resolving agent.

*d*-Amphetamine is a powerful analeptic which is useful in inducing stimulation of the central nervous system and in the treatment of obesity. Heretofore, this compound has been produced by resolution of *dl*-amphetamine employing the conventional resolving agent *d*-tartaric acid. This procedure has a number of disadvantages. The procedure requires a number of slow and tedious recrystallizations before a practical resolution is obtained. Moreover, the yield of the desired *d*-amphetamine is undesirably low. Nevertheless, while the art has long sought for an improved method of resolution and despite the disadvantages encountered there has in the past been no more satisfactory way of resolving amphetamine.

I have now developed a new method which surprisingly eliminates the disadvantages mentioned and makes it possible to resolve *dl*-amphetamine inexpensively and in good yield.

In accordance with the invention the individual optical isomers of amphetamine are produced by dissolving *dl*-amphetamine and on optical isomer of an N-acyl alpha amino acid in a hydroxylic solvent at elevated temperature, cooling the solution to provide a liquid phase containing an optical isomer of amphetamine and a solid phase consisting of the N-acyl amino acid addition salt of the opposite optical isomer of amphetamine, separating the phases and isolating the optical isomers of amphetamine from the separate phases. Both of the *d*- and *l*-amphetamine products are useful as resolving agents, and the *d*-isomer is also useful for its physiological properties as mentioned. It will be understood that in a case where only one particular isomer is desired, it will suffice following the separation of the two phases to further process only the phase containing it. The process is particularly advantageous in that a high yield of relatively pure amphetamine isomers is obtained in one cycle without the need for further resolution.

As indicated, in carrying out the process of the invention the optical isomers of N-acyl alpha amino acids are employed as resolving agents. Preferably, the N-acyl derivatives of commonly known alpha amino acids are employed. Among the many resolving agents which can be suitably employed are those derivable from the monoamino dicarboxylic acids such as aspartic and glutamic acids, the monoamino monocarboxylic acids such as α-alanine, valine, leucine, isoleucine, phenylalanine, serine, threonine, cysteine, methionine, tryptophane and tyrosine, and the basic amino acids such as lysine. The term "acyl" as used herein denotes a carboxylic acid acyl group and includes aliphatic acyl groups such as formyl, acetyl, dichloroacetyl, propionyl, methoxyacetyl and the like, and benzoyl and araliphatic groups such as phenylacetyl, carbobenzoxy and the like. While any of the optical isomers of the mentioned N-acyl alpha amino acids may be suitably employed in the process of the present invention, it is preferable for reasons of economy to employ only those isomers which are readily available and which are relatively inexpensive. For example, some of the various preferred N-acyl amino acids are *d*- and *l*-N-acetylserine, *l*-N-acetyltyrosine and *l*-N-acetylglutamic acid.

It will be understood that there are various satisfactory ways of forming the solution of *dl*-amphetamine and the resolving agent. The choice of solvent itself is subject to considerable variation and in any given case will depend to some extent on the nature of the resolving agent employed. In general, a hydroxylic solvent such as water, alcohol or aqueous alcohol, will be satisfactory. In some cases it is preferable to employ water alone while in other cases an aqueous alcoholic solvent or an anhydrous alcohol is preferred. For example, water is conveniently employed as a solvent in the resolution with *l*-N-acetylvaline and absolute alcohol in the resolution with *l*-N-acetyltyrosine. Alcohols which boil at relatively low temperature, i.e. below 120° C., are preferred, particularly ethanol and methanol. In accordance with the invention the solvent is employed in an amount sufficient to dissolve the *dl*-amphetamine and resolving agent at elevated temperature, i.e. a temperature higher than room temperature, but insufficient to maintain the solids in solution during the cooling step. In general, the amount to be employed can be varied from 0.4 to 4 liters for each mole of resolving agent present.

The usual manner of forming the solution involves first dissolving or suspending the resolving agent in the solvent with heating if necessary and then adding *dl*-amphetamine to the mixture. When added, the resolving agent and amphetamine react to form an acid addition salt and the resulting heat of reaction facilitates the dissolution of any remaining undissolved solids. Conveniently, the temperature of the mixture prior to addition of resolving agent can be brought to within 10 to 15° below the boiling point so that the addition of the resolving agent will cause the mixture to boil moderately.

There are various other satisfactory methods of forming the desired solution. For instance, it will also be satisfactory to dissolve the materials simultaneously by heating together in the solvent, or combining separate solutions of the same, or to reverse the order of addition so that the resolving agent is added to a solution containing the amphetamine.

The proportion of resolving agent employed in the process may be varied considerably. In general, it will be satisfactory to employ equivalent amounts of amphetamine and resolving agent. In some instances, one-half equivalent of resolving agent can be employed for each mole of *dl*-amphetamine. In this case, the amphetamine and resolving agent react selectively in solution to form the acid addition salt of only one of the amphetamine isomers, the opposite amphetamine isomer being present only in free base form. In such a case the solution is exhausted with respect to free N-acyl amino acid. Larger proportions of the resolving agent can be employed if desired but there is no particular advantage in employing the agent in a proportion greater than one mole for each mole of amphetamine present.

After complete solution of the solids is attained, the solution is allowed to cool, preferably with continuous agitation or stirring, until the acid addition salt of the amphetamine isomer separates or crystallizes out. This usually requires about 6 to 20 hours when allowed to stand at room temperature. It is an unexpected and desirable feature of the process that agitation or stirring of the resolution liquor has no substantial effect on the desired selective cropping out or crystallization of the salt of the single amphetamine isomer alone. Ordinarily, it would be expected that agitation and vigorous stirring would cause both of the isomers to separate alike. Therefore, in view of the highly selective character of the present process in this respect, it is advantageous to stir or agitate the solution in order to assure the formation of fine crystals and to prevent or minimize the potential occlusion or carrying down of the opposite isomer in the precipitating crystals of the salt of the first isomer. A further advantage of the process is that seeding is ordinarily not required to initiate the desired crystallization.

I have found that in practice most of the $l$-N-acyl amino acids employed cause the $l$-amphetamine salt to precipitate, thereby leaving the $d$-form in the liquid phase. For example, the use of $l$-N-acetylserine results in the precipitation of the $l$-amphetamine salt of $l$-N-acetylserine. However, in some instances, a particular $l$-N-acyl amino acid will cause the $d$-amphetamine salt to precipitate thereby leaving the $l$-form in the liquid phase. For example, the use of $l$-N-acetylmethionine results in the precipitation of the $d$-amphetamine salt of $l$-N-acetylmethionine. It will be understood that the designations "$d$" and "$l$" used in referring to the resolving agent indicate direction of optical rotation and are not necessarily related to the absolute stereochemical configuration of the agent.

After crystallization is complete, the crystals are removed from the mother liquor or liquid phase, conveniently by filtration. The desired isomers can be isolated in various ways. In a case where a particular isomer is present in free base form, isolation can be satisfactorily accomplished by distillation or by converting the same to an insoluble salt such as the bitartrate and recovering the salt by filtration. In a case where the isomer is present in addition salt form, isolation can be satisfactorily accomplished by crystallizing the salt, collecting the crystals and basifying an aqueous solution of the same to obtain the free amine, extracting with an immiscible organic solvent and recovering the isomer from the extract by distillation or other suitable means. If desired, the resolving agent can be recovered from the residual solution remaining after extraction by subjecting the solution to ion exchange employing a cationic exchanger in the acid form. The effluent containing the resolving agent can then be used directly or worked up by concentrating and drying to obtain the resolving agent.

The invention is illustrated by the following examples which show the use, as a solvent, of water, alkanols which boil below 120° C. and aqueous solutions of alkanols which boil below 120° C.; also shown is the use, as resolving agents, of N-(carboxylic acid acyl)alpha amino acids in which the acyl group is a lower aliphatic acyl group, a benzoyl group or a carbobenzoxy group.

Example 1

735 grams of $l$-N-acetylserine is dissolved in 2.5 liters of 95% ethanol and 1350 g. of $dl$-amphetamine is added to the solution with stirring. Stirring is continued for 16 to 20 hours at 23–25° C. The crystals which form consisting of the $l$-amphetamine salt of $l$-N-acetylserine are filtered, washed with 100 ml. of ethanol and dried; $[\alpha]_D^{25} = -20°$ (4% in water). The crystals are dissolved in water and the solution is made alkaline with 20% sodium hydroxide solution and extracted with several portions of ether. The extract containing free $l$-amphetamine is dried and distilled. The $l$-amphetamine which distills has an optical rotation, $[\alpha]_D^{26}$, of $-29°$ (0.7% in ethanol).

1 kg. of tartaric acid is dissolved in three liters of 95% ethanol and 300 ml. of water with heating and the solution is added to the filtrate from the above mixture. The resulting liquor is cooled and allowed to stand at 23–25° C. for 16 hours. The resulting crystalline product, $d$-amphetamine bitartrate, is removed from the mother liquor by filtration. The product is dried in vacuo; $[\alpha]_D^{25} = +29°$ (4% in water). The yield is 90% of theoretical or 1275 g.

Example 2

2.7 grams of $dl$-amphetamine and 1.89 g. of $l$-N-acetylglutamic acid are dissolved in a solution of 45 ml. of isopropanol and 5 ml. of water with heating, and allowed to stand for 16 hours at 23–25° C. The crop of $l$-amphetamine salt of $l$-N-acetylglutamic acid which forms is filtered off and dried in vacuo; $[\alpha]_D^{26} = -2.7°$ (1.8% in water). The salt is dissolved in water, made alkaline and extracted with ether. The extract is dried and distilled to obtain the isomer, $l$-amphetamine; $[\alpha]_D^{26} = -29°$ (0.7% in ethanol).

The filtrate is reduced in volume to about 25 ml. and cooled to obtain the $d$-amphetamine salt of $l$-N-acetylglutamic acid which on recrystallization from water has an optical rotation, $[\alpha]_D^{26}$, of $+23.8$ (2% in water). The crystals are dissolved in water and made alkaline with dilute sodium hydroxide. The resulting free $d$-amphetamine is extracted with toluene and the toluene solution is dried and distilled. The $d$-amphetamine which distills has an optical rotation, $[\alpha]_D^{26}$, of $+28.6°$ (0.7% in ethanol); yield approximately 70%.

Example 3

2.2 grams of $l$-N-acetyltyrosine and 1.7 g. of $dl$-amphetamine are dissolved in 50 ml. of absolute ethanol with heating. The solution is allowed to stand for 18 to 20 hours at 23–25° C. and the crystals removed by filtration. The crystalline product, $l$-amphetamine salt of $l$-N-acetyltyrosine, has an optical rotation, $[\alpha]_D^{26}$, of $+40.25°$ (2% in water). The salt is dissolved in water, made alkaline and extracted with ether. The extract is dried and distilled to obtain the isomer, $l$-amphetamine; $[\alpha]_D^{26} = -28.8°$ (0.7% in ethanol). The filtrate is reduced in volume, made alkaline and extracted with toluene. The toluene extract is dried and distilled. The product is $d$-amphetamine.

Example 4

13.5 grams of $dl$-amphetamine and 6.5 g. of $l$-N-acetylalanine are dissolved with heating in 125 ml. of 95% ethanol and the resulting solution is cooled and allowed to stand 16 to 18 hours at 23–25° C. during which time a feathery precipitate is formed. The precipitate which consists of the $l$-amphetamine salt of $l$-N-acetylalanine is removed by filtration and recrystallized from hot ethanol; $[\alpha]_D^{25} = -33°$ (2% in water).

A solution of 10 g. of tartaric acid in 50 ml. of 90% ethanol is added to the filtrate. The solution is cooled and allowed to stand at 20 to 25° C. for 16 to 20 hours. The resulting crystalline $d$-amphetamine bitartrate is removed by filtration and dried in vacuo; $[\alpha]_D^{25} = +29°$ (4% in water).

Example 5

1.35 grams of $dl$-amphetamine and 0.79 g. of $l$-N-acetylvaline are dissolved with heating in 20 ml. of water and the solution is cooled and held for 16 to 20 hours at 23–25° C. The resulting feathery precipitate consisting of the $l$-amphetamine salt of $l$-N-acetylvaline is removed by filtration. The filtrate is combined with a solution of 0.5 g. of sulfuric acid in 5 ml. of ethanol. The resulting solution is cooled and allowed to stand at 23–25° C. for 16 to 20 hours. The crystalline product which precipitates, $d$-amphetamine sulfate, is removed from the mother liquor by filtration.

Example 6

6.75 grams of $dl$-amphetamine and 5.17 g. of $l$-N-acetylphenylalanine are dissolved with heating in 150 ml. of 95% ethanol and the resulting solution is cooled and allowed to stand 16 to 18 hours at 23–25° C. The resulting precipitate consisting of the $l$-amphetamine salt of $l$-N-acetylphenylalanine is removed by filtration. The filtrate is combined with a warm solution of 3.75 g. of tartaric acid in 25 ml. of 90% ethanol. The combined solutions are cooled and allowed to stand at 20° for 16 hours. The crystalline product, $d$-amphetamine bitartrate, is recovered from the mother liquor by filtration and is dried in vacuo; $[\alpha]_D^{25} = +29°$ (4% in water).

Example 7

13.5 grams of dl-amphetamine and 9.56 g. of d-N-acetylmethionine are dissolved with heating in 125 ml. of 95% ethanol and the resulting solution is allowed to cool slowly for 16 hours. The feathery precipitate which forms consisting of the l-amphetamine salt of d-N-acetylmethionine is removed by filtration. The filtrate is combined with a warm solution of 7.5 g. of tartaric acid in 50 ml. of 90% ethanol. The combined solutions are cooled and allowed to stand at 23–25° C. for 16 to 20 hours. The crystalline d-amphetamine bitartrate which separates is removed from the mother liquor by filtration.

Example 8

1.4 grams of dl-amphetamine and 1.05 g. of l-N-benzoylserine are dissolved by warming in 7 ml. of water and the resulting solution is allowed to stand for 16 hours. The resulting precipitate consisting of the l-amphetamine salt of l-N-benzoylserine is removed by filtration. A solution of 0.8 g. of tartaric acid in 5 ml. of ethanol is added to the filtrate. The resulting solution is allowed to stand at room temperature for 20 hours. The product which precipitates, d-amphetamine bitartrate, is recovered by filtration and dried in vacuo.

Example 9

13.5 grams of dl-amphetamine and 12.3 g. of l-N-acetyltryptophan are dissolved by heating at 70° C. in 150 ml. of 95% ethanol and the solution obtained is allowed to stand for 18 hours at room temperature. The precipitate which forms consisting of l-amphetamine salt of l-N-acetyltryptophane is removed by filtration. The filtrate is combined with a warm solution of 7.5 g. of tartaric acid in 40 ml. of 90% ethanol and is allowed to stand at 20–25° C. for 16 to 20 hours. The resulting crystalline d-amphetamine bitartrate is recovered by filtration and dried in vacuo; $[\alpha]_D^{25} = +29°$ (4% in water).

Example 10

4.8 grams of d-N-carbobenzoxyserine is dissolved in 20 ml. of 50% ethanol at 50° C. and 2.7 g. of dl-amphetamine is added. The resulting solution is allowed to stand for 16 to 20 hours at room temperature. The resulting crystalline precipitate consisting of the d-amphetamine salt of d-N-carbobenzoxyserine is removed by filtration. The crystals are dissolved in water and made alkaline with dilute aqueous sodium hydroxide solution. The resulting free d-amphetamine is extracted with ether and the ether extract is dried and distilled. The product, d-amphetamine, which is obtained in the distillate has an optical rotation, $[\alpha]_D^{26}$, of +33° (3.7% in ethanol).

I claim:

1. Process for the production of optical isomers of amphetamine comprising the steps of forming at elevated temperature a solution of dl-amphetamine and an optical isomer of an N-(carboxylic acid acyl)alpha amino carboxylic acid in a solvent selected from the class consisting water, alkanols which boil below 120° C. and aqueous solutions of alkanols which boil below 120° C., cooling the solution to provide a liquid phase containing an optical isomer of amphetamine and a solid phase consisting of the N-acyl amino carboxylic acid addition salt of the opposite optical isomer of amphetamine, separating the phases and isolating the amphetamine isomers from said separate phases, said carboxylic acid acyl being selected from the class consisting of unsubstituted lower aliphatic acyl, chloro-substituted lower aliphatic acyl, methoxy-substituted lower aliphatic acyl, benzoyl and carbobenzoxy.

2. Process for the production of d-amphetamine comprising the steps of forming at elevated temperature a solution of dl-amphetamine and an optical isomer of an N-(carboxylic acid acyl)alpha amino carboxylic acid in a solvent selected from the class consisting of water, alkanols which boil below 120° C. and aqueous solutions of alkanols which boil below 120° C., cooling the solution to provide a liquid phase containing an optical isomer of amphetamine and a solid phase consisting of the N-acyl amino carboxylic acid addition salt of the opposite optical isomer of amphetamine, separating the phases and isolating d-amphetamine from one of said phases, said carboxylic acid acyl being selected from the class consisting of unsubstituted lower aliphatic acyl, chloro-substituted lower aliphatic acyl, methoxy-substituted lower aliphatic acyl, benzoyl and carbobenzoxy.

3. Process for the production of amphetamine in optical isomeric form comprising the steps of forming at elevated temperature a solution of dl-amphetamine and an optical isomer of an N-(carboxylic acid acyl)alpha amino carboxylic acid in a solvent selected from the class consisting of water, alkanols which boil below 120° C. and aqueous solutions of alkanols which boil below 120° C., cooling the solution to provide a liquid phase containing an optical isomer of amphetamine and a solid phase consisting of the N-acyl amino carboxylic acid addition salt of the opposite optical isomer of amphetamine, separating the phases and isolating the optical isomer of amphetamine from at least one of said separate phases, said carboxylic acid acyl being selected from the class consisting of unsubstituted lower aliphatic acyl, chloro-substituted lower aliphatic acyl, methoxy-substituted lower aliphatic acyl, benzoyl and carbobenzoxy.

4. Process for the production of d-amphetamine comprising the steps of forming at elevated temperature a solution of dl-amphetamine and at least a one-half equivalent proportion of an optical isomer of an N-(carboxylic acid acyl)alpha amino carboxylic acid in a solvent selected from the class consisting of water, alkanols which boil below 120° C. and aqueous solutions of alkanols which boil below 120° C., cooling and allowing the solution to stand to provide a liquid phase containing an optical isomer of amphetamine and a solid phase consisting of the N-acyl amino carboxylic acid addition salt of the opposite optical isomer of amphetamine, separating the phases and isolating d-amphetamine from one of said phases, the quantity of said solvent being sufficient to dissolve said amphetamine and N-acyl amino carboxylic acid at elevated temperature but insufficient to maintain the solids in solution at substantially lower temperature, said carboxylic acid acyl being selected from the class consisting of unsubstituted lower aliphatic acyl, chloro-substituted lower aliphatic acyl, methoxy-substituted lower aliphatic acyl, benzoyl and carbobenzoxy.

5. Process for the production of d-amphetamine comprising the steps of forming at elevated temperature a solution of dl-amphetamine and l-N-acetyl glutamic acid in a solvent selected from the class consisting of water, alkanols which boil below 120° C. and aqueous solutions of alkanols which boil below 120° C., cooling the solution to provide a liquid phase and a solid phase, separating the phases and isolating d-amphetamine from said liquid phase.

6. Process for the production of d-amphetamine comprising the steps of forming at elevated temperature a solution of dl-amphetamine and l-N-acetyltyrosine in a solvent selected from the class consisting of water, alkanols which boil below 120° C. and aqueous solutions of alkanols which boil below 120° C., cooling the solution to provide a liquid phase and a solid phase, separating the phases and isolating d-amphetamine from said liquid phase.

7. Process for the production of d-amphetamine comprising the steps of forming at elevated temperature a solution of dl-amphetamine and l-N-acetylserine in a solvent selected from the class consisting of water, alkanols which boil below 120° C. and aqueous solutions of alkanols which boil below 120° C., cooling the solution to provide a liquid phase and a solid phase, separating the phases and isolating d-amphetamine from said liquid phase.

References Cited in the file of this patent

UNITED STATES PATENTS

| | | |
|---|---|---|
| 2,276,508 | Nabenhauer | Mar. 17, 1952 |
| 2,276,509 | Nabenhauer | Mar. 17, 1952 |
| 2,528,267 | Dearborn et al. | Oct. 31, 1950 |
| 2,556,907 | Emmick | June 12, 1951 |
| 2,657,230 | Rogers | Oct. 27, 1953 |
| 2,766,286 | D'Amato et al. | Oct. 9, 1956 |

OTHER REFERENCES

Gilman et al.: Organic Chemistry, vol. I, pp. 189–190 (1938).